US007211641B2

(12) United States Patent
Shafer et al.

(10) Patent No.: US 7,211,641 B2
(45) Date of Patent: May 1, 2007

(54) LIQUID CRYSTAL POLYCARBONATES AND METHODS OF PREPARING SAME

(75) Inventors: Sheldon Shafer, Clifton Park, NY (US); Julia Lee, Niskayuna, NY (US)

(73) Assignee: General Electric Company, Schenectady, NY (US)

( * ) Notice: Subject to any disclaimer, the term of this patent is extended or adjusted under 35 U.S.C. 154(b) by 139 days.

(21) Appl. No.: 10/789,781

(22) Filed: Feb. 27, 2004

(65) Prior Publication Data

US 2005/0192424 A1   Sep. 1, 2005

(51) Int. Cl.
*C08G 64/00* (2006.01)

(52) U.S. Cl. .................. 528/196; 264/176.1; 264/219; 502/150; 528/198

(58) Field of Classification Search ............. 264/176.1, 264/219; 528/196, 198; 502/150
See application file for complete search history.

(56) References Cited

U.S. PATENT DOCUMENTS

| | | | | | |
|---|---|---|---|---|---|
| 4,831,105 | A | * | 5/1989 | Schissel ....................... | 528/204 |
| 5,102,975 | A | * | 4/1992 | Riding ........................ | 528/204 |
| 6,518,391 | B1 | * | 2/2003 | McCloskey et al. ......... | 528/196 |
| 2003/0078347 | A1 | * | 4/2003 | Brown et al. ................ | 525/390 |
| 2003/0149223 | A1 | | 8/2003 | McCloskey et al. | |
| 2003/0208027 | A1 | * | 11/2003 | Brack et al. ................. | 528/196 |

FOREIGN PATENT DOCUMENTS

WO    WO 03010220    6/2003

OTHER PUBLICATIONS

"Hackh's Chemical Dictionary", Fourth edition, Julius Grant, 1972, p. 533.*
Stanley Pine, fifth edition, Organic Chemistry "Synthetic Polymers"p. 970 section 25-5.*
Kricheldorf et al, Polymers of carbonic acid, 1; Synthesis of thermotropic aromatic polycarbonates by means of bis(trichloromethyl) carbonate, Makromol. Chem., Rapid Commun., 1989, pp. 383-386, vol. 10, No. 8.
Kricheldorf et al., Polymers of Carbonic Acid. 3. Thermotropic Polycarbonates Derived from 4,4'-Dihydroxybiphenyl and Various Diphenols, Macromolecules, 1990, pp. 2656-2666, vol. 23, No. 10.
Sun et al., Studies on the Thermotropic Liquid Crystalline Polycarbonates. II. Synthesis and Properties of Fully Aromatic Liquid Crystalline Polycarbonates, Journal of Polymer Science: Part A: Polymer Chemistry, 1993, pp. 2237-2243, vol. 31, Publisher: John Wiley & Sons, Inc.
Sun et al., Studies on the Thermotropic Liquid Crystalline Polycarbonates. III. Synthesis and Properties of Fully Aromatic Liquid Crystalline Polycarbonates, Journal of Polymer Science: Part A: Polymer Chemistry, 1993, pp. 2711-2719, vol. 31, Publisher: John Wiley & Sons, Inc.
Sun et al., Thermotropic Liquid Crystalline Polycarbonates VI. Synthesis and Properties of Fully Aromatic Liquid Crystalline Polycarbonates by Interfacial or Solution Polycondensation, Polymer Journal, 1997, pp. 25-32, vol. 29, No. 1.

* cited by examiner

*Primary Examiner*—Terressa Boykin
(74) *Attorney, Agent, or Firm*—Marina Larson & Associates, LLC

(57) ABSTRACT

Liquid crystal polycarbonates are made by forming a reaction mixture containing (a) an activated diaryl carbonate; (b) at least two species of aromatic diols selected from among resorcinol, 4,4'-biphenol, hydroquinone, methylhydroquinone, 4,4'-dihydroxyphenylether, dihydroxynaphthalene, including in particular the 2,6, 1,5, and 2,7 isomers, 4,4'-dihydroxybenzophenone and 2,6-dihydroxyanthraquinone (anthraflavic acid); and (c) optionally bisphenol A in a maximum amount of 10 mole %; and processing the reaction mixture in a melt transesterification reaction to form a liquid crystal polycarbonate. While the product composition has the same overall characteristics as compositions made using diphenyl carbonate as the donor moiety for the carbonate linkage, they are analytically distinguishable because of limited incorporation of intermediate or end-cap residues derived from the activated diaryl carbonate.

49 Claims, 3 Drawing Sheets

$^{13}$C NMR spectrum of 65/35 MeHQ/BP copolycarbonate in tetrachloroethane-d$_2$ at 80°C

LIQUID CRYSTAL POLYCARBONATES AND METHODS OF PREPARING SAME

BACKGROUND OF THE INVENTION

This application relates to liquid crystal polycarbonates and to methods of preparing such materials.

Liquid crystalline materials are materials that in a liquid state display anisotropic, i.e., ordered, molecular arrangements. In the case of polymeric materials, the liquid state is generally a melt in which the polymers are aligned, although some lyotropic polymers in which the alignment occurs in solution are known. Most commercial applications of liquid crystal polymers are based on polyesters or polyamides (for example Kevlar®).

U.S. Pat. No. 4,831,105 describes liquid crystalline polycarbonates made by melt transesterification of diphenylcarbonate (DPC) and a mixture of methylhydroquinone and 4,4'-dihydroxybiphenyl. U.S. Pat. No. 5,102,975 describes liquid crystal polycarbonates made by a melt transesterification of DPC and a mixture of 4,4'-dihydroxybiphenyl and 4,4'-dihydroxyphenylether. These liquid crystal polycarbonates have desirable properties for use as molding compositions because of high heat resistance, outstanding dimensional stability and excellent solvent resistance. However, the difficult manufacturing processes for these materials have prevented substantial commercial development. There is therefore a need for an improved and more facile method to make liquid crystalline polycarbonates. This application provides such a method, and further provides compositions made by this method.

SUMMARY OF THE INVENTION

In accordance with the present invention, liquid crystal polycarbonates are made by a method comprising the steps of:
 forming a reaction mixture comprising
  (a) an activated diaryl carbonate;
  (b) at least two species of aromatic diols selected from the group consisting of resorcinol, 4,4'-biphenol, hydroquinone, methylhydroquinone, 4,4'-dihydroxyphenylether, dihydroxynaphthalene, including in particular the 2,6, 1,5, and 2,7 isomers, 4,4'-dihydroxybenzophenone and 2,6-dihydroxyanthraquinone (anthraflavic acid); and
  (c) optionally bisphenol A in a maximum amount of 10 mole %; and
 processing the reaction mixture in a melt transesterification reaction to form a liquid crystal polycarbonate.

The invention further provides compositions made by this method. While these composition have the same overall characteristics as compositions made using DPC as the donor moiety for the carbonate linkage, they are analytically distinguishable because of limited incorporation of ester carbonate residues derived from the activated diaryl carbonate. Thus, this application is also addressed to liquid crystal polycarbonate compositions comprising:
 residues of at least two species of aromatic diols selected from the group consisting of resorcinol, 4,4'-biphenol, hydroquinone, methylhydroquinone, 4,4'-dihydroxyphenylether, dihydroxynaphthalene, including in particular the 2,6, 1,5, and 2,7 isomers, 4,4'-dihydroxybenzophenone and 2,6-dihydroxyanthraquinone (anthraflavic acid); and
 residues derived from an activated diaryl carbonate.

DETAILED DESCRIPTION OF THE INVENTION

Figure 1:
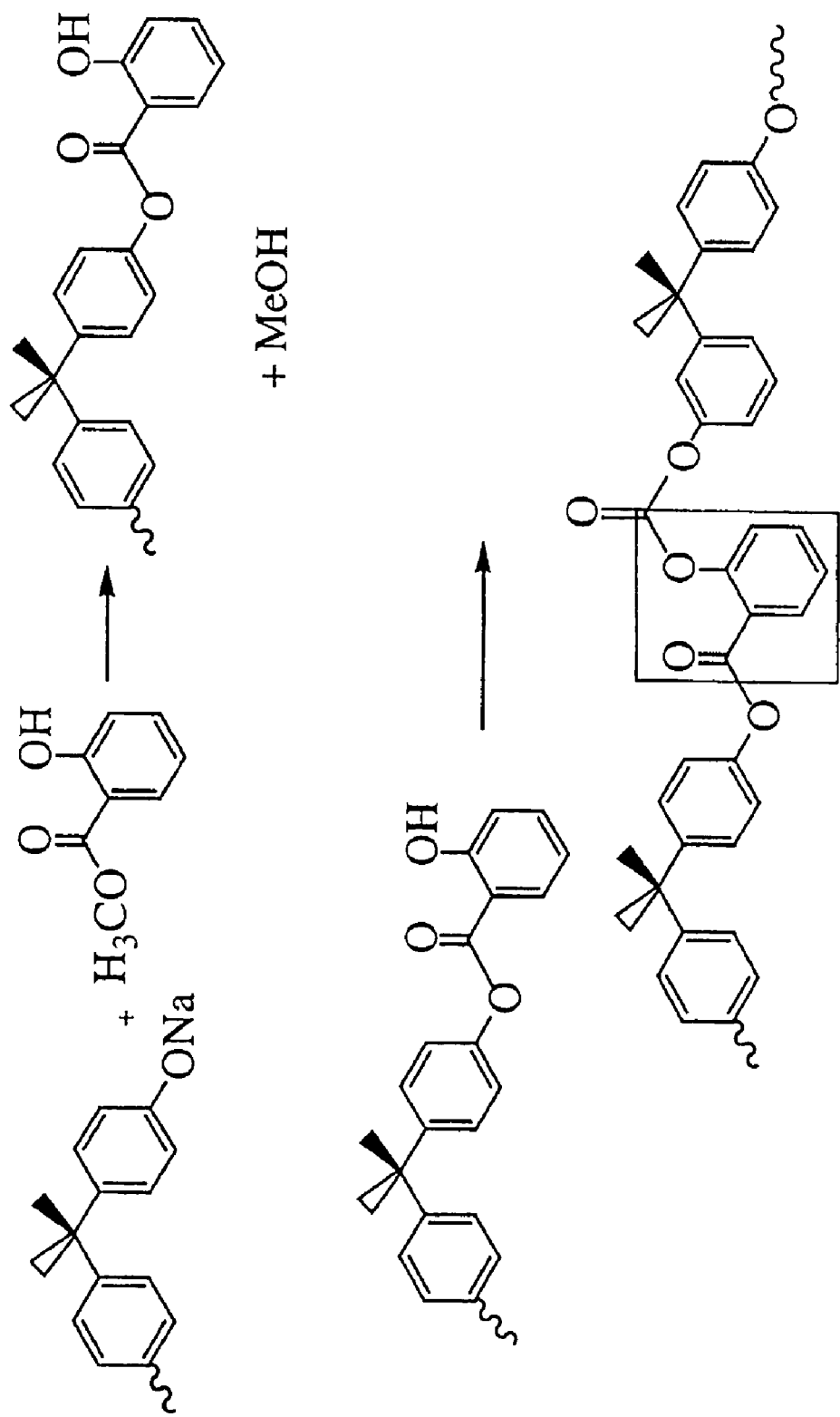
FIG. 1 shows the formation of ester carbonate residues in compositions in accordance with the invention.

Numerical values in the specification and claims of this application, particularly as they relate to polymer compositions, reflect average values for a composition that may contain individual polymers of different characteristics. Furthermore, the numerical values should be understood to include numerical values which are the same when reduced to the same number of significant figures and numerical values which differ from the stated value by less than the experimental error of the measurement technique used in the present application to determine the value.

As used in the specification and claims of this application, the term "liquid crystal polycarbonate" refers to a polymer having residues derived from at least two species of aromatic diol linked via carbonate residues. Compositions can be recognized as liquid crystal polymers through observation of bifringence in a melt, for example using a hot stage mciroscope under cross polarizers, through the observation of fiberulation of polymer strands and/or through observation of opalescence on product surfaces.

As used herein the term "structural units indicative of the activated carbonate" means either internal "kinks" in the copolycarbonate or end groups caused by incorporation of a fragment of an activated carbonate such as bismethylsalicyl carbonate (BMSC).

Significant characteristics of liquid crystal polymers include their thermal properties. In assessing thermal properties, one can measure
 Tm, the melting temperature, that is the solid to liquid crystalline transition. In describing liquid crystals with ordering in only one plane (a nematic state), this may be considered the same as Ts-n, the temperature at which a transition occurs from a solid to a nematic state;
 Tc, the temperature of crystallization, generally determined using a scanning temperature change for example at a rate of 20 C/min; and
 Tm-Tc. Tm-Tc is considered a good measure of the rate of crystallization in conventional crystalline materials such as nylon of PBT. PBT, which is a fast crystallizing material, has a Tm-Tc of ~40° C. (scanning down at 20° C./min). In the context of liquid crystalline polymers, this rate a crystallization is less significant. Nevertheless, it may be desirable to have values of Tm-Tc of less than 75° C., for example less than 60° C. for some applications.

In accordance with the present invention, liquid crystal polycarbonates are made by a method comprising the steps of:
 forming a reaction mixture comprising
  (a) an activated diaryl carbonate;
  (b) at least two species of aromatic diols selected from the group consisting of resorcinol, 4,4'-biphenol, hydroquinone, methylhydroquinone, 4,4'-dihydroxyphenylether, dihydroxynaphthalene, including in particular the 2,6, 1,5, and 2,7 isomers, 4,4'-dihydroxybenzophenone and 2,6-dihydroxyanthraquinone (anthraflavic acid); and (c) optionally bisphenol A in a maximum amount of 10 mole %; and processing the reaction mixture in a melt transesterification reaction to form a liquid crystal polycarbonate.

The step of forming a reaction mixture can be done in any of several ways. The reagents to be included in the reaction mixture can be pre-melted and then combined, can be combined in solid, for example pellet or powder form and then melted, or a combination thereof. Addition of reagents to the reaction mixture during the course of processing the reaction mixture in a transesterification reaction may also be done without departing from the scope of the present invention.

As used herein the term "activated diaryl carbonate" is defined as a diaryl carbonate that is more reactive than diphenylcarbonate toward transesterification reactions. Such activated diaryl carbonate typically have the formula III:

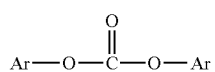

(III)

wherein Ar is a substituted aromatic radical having 6 to 30 carbon atoms. The preferred activated carbonates have the more specific general formula (IV):

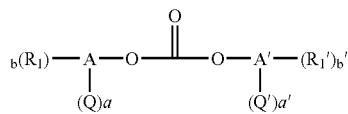

(IV)

wherein Q and Q' are each independently activating groups. A and A' are each independently aromatic rings, or multiple rings, ie naphthalene provided that the substituents Q and Q' are on the ring attached to the carbonate group. The aromatic rings can be the same or different depending on the number and location of their substituent groups, and a and a' are whole numbers of zero up to a maximum equivalent to the number of replaceable hydrogen groups substituted on the aromatic rings A and A' respectively, wherein a+a'≧1. In preferred embodiments, substituents are located in the two positions ortho to the carbonate group and/or the position para to the carbonate group. $R_1$ and $R_1'$ are each independently substituent groups such as alkyl, substituted alkyl, cycloalkyl, alkoxy, aryl, alkylaryl, cyano, nitro, or halogen, or can together form a group, ie cycloalkyl, spiro. The number b is a whole number of from zero up to a maximum equivalent to the number of replaceable hydrogen atoms on the aromatic ring(s) A minus the number a, and the number b' is a whole number of from zero up to a maximum equivalent to the number of replaceable hydrogen atoms on the aromatic ring(s) A' minus the number a'. The number, type and location of the $R_1$ or $R_1'$ subsituents on the aromatic ring is not limited unless the combined effect of the activating and deactivating groups is such that it leads to a carbonate which is less reactive than diphenylcarbonate. It is possible that a single substituent actually has a deactivating effect on the carbonate by itself, but that this is overcome by a very strong activating group).

Non-limiting examples of activating groups Q and Q' are: alkoxycarbonylaryl groups, halogens, nitro groups, amide groups, sulfone groups, sulfoxide groups, or imine groups with structures indicated below:

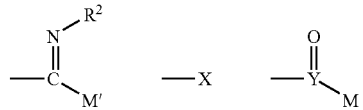

X=halogen or $NO_2$
Z=O, N
M=N-dialkyl, alkyl, aryl, aryloxy, alkoxy
$R^2$=alkyl or aryl when n=1
n=0 or 1.

Specific and non-limiting examples of activated carbonates include bis(o-methoxycarbonylphenyl)carbonate, bis(o-chlorophenyl)carbonate, bis(o-nitrophenyl)carbonate, bis(o-acetylphenyl)carbonate, bis(o-phenylketonephenyl)carbonate, bis(o-formylphenyl)carbonate. Unsymmetrical combinations of these structures, where the substitution number and type on A and A' are different, are also possible to employ in the current invention. A preferred structure for an activated carbonate is an ester-substituted diaryl carbonate having the structure (X):

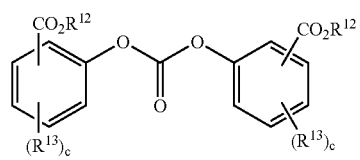

(X)

wherein $R^{12}$ is independently at each occurrence a $C_1$–$C_{20}$ alkyl radical, $C_4$–$C_{20}$ cycloalkyl radical, or $C_4$–$C_{20}$ aromatic radical; $R^{13}$ is independently at each occurrence a halogen atom, cyano group, nitro group, $C_1$–$C_{20}$ alkyl radical, $C_4$–$C_{20}$ cycloalkyl radical, $C_4$–$C_{20}$ aromatic radical, $C_1$–$C_{20}$ alkoxy radical, $C_4$–$C_{20}$ cycloalkoxy radical, $C_4$–$C_{20}$ aryloxy radical, $C_1$–$C_{20}$ alkylthio radical, $C_4$–$C_{20}$ cycloalkylthio radical, $C_4$–$C_{20}$ arylthio radical, $C_1$–$C_{20}$ alkylsulfinyl radical, $C_4$–$C_{20}$ cycloalkylsulfinyl radical, $C_4$–$C_{20}$ arylsulfinyl radical, $C_1$–$C_{20}$ alkylsulfonyl radical, $C_4$–$C_{20}$ cycloalkylsulfonyl radical, $C_4$–$C_{20}$ arylsulfonyl radical, $C_1$–$C_{20}$ alkoxycarbonyl radical, $C_4$–$C_{20}$ cycloalkoxycarbonyl radical, $C_4$–$C_{20}$ aryloxycarbonyl radical, $C_2$–$C_{60}$ alkylamino radical, $C_6$–$C_{60}$ cycloalkylamino radical, $C_5$–$C_{60}$ arylamino radical, $C_1$–$C_{40}$ alkylaminocarbonyl radical, $C_4$–$C_{40}$ cycloalkylaminocarbonyl radical, $C_4$–$C_{40}$ arylaminocarbonyl radical, or $C_1$–$C_{20}$ acylamino radical; and c is independently at each occurrence an integer 0–4. At least one of the substituents $CO_2R^{12}$ is preferably attached in an ortho position relative to the carbonate group of formula X.

Examples of preferred ester-substituted diaryl carbonates include but are not limited to bis(methylsalicyl)carbonate (CAS Registry No. 82091-12-1) (also known as BMSC or bis(o-methoxycarbonylphenyl)carbonate), bis(ethyl salicyl) carbonate, bis(propyl salicyl)carbonate, bis(butylsalicyl)carbonate, bis(benzyl salicyl)carbonate, bis(methyl 4-chlorosalicyl)carbonate and the like. Typically bis(methylsalicyl)

carbonate is preferred for use in melt polycarbonate synthesis due to its lower molecular weight and higher vapor pressure.

Some non-limiting examples of non-activating groups which, when present in an ortho position relative to the carbonate group, would not be expected to result in activated carbonates are alkyl, cycolalkyl or cyano groups. Some specific and non-limiting examples of non-activated carbonates are bis(o-methylphenyl)carbonate, bis(p-cumylphenyl) carbonate, bis(p-(1,1,3,3-tetramethyl)butylphenyl)carbonate and bis(o-cyanophenyl)carbonate. Unsymmetrical combinations of these structures are also expected to result in non-activated carbonates.

Unsymmetrical diaryl carbonates wherein one aryl group is activated and one aryl is inactivated or de-activated would also useful in this invention if the activating group renders the diaryl carbonate still more reactive than diphenyl carbonate.

One method for determining whether a certain diaryl carbonate is activated or is not activated is to carry out a model transesterification reaction between the certain diaryl carbonate with a phenol such as p-(1,1,3,3-tetramethyl)butyl phenol (and comparing the reactivity of the diaryl carbonate to the reactivity of diphenyl carbonate under the same conditions). This phenol is preferred because it possesses only one reactive site, possesses a low volatility and possesses a similar reactivity to bisphenol-A. The model transesterification reaction is carried out at temperatures above the melting points of the certain diaryl carbonate and p-(1,1,3,3-tetramethy)butyl phenol and in the presence of a transesterification catalyst, which is usually an aqueous solution of sodium hydroxide or sodium phenoxide. Preferred concentrations of the transesterification catalyst are about 0.001 mole % based on the number of moles of the phenol or diaryl carbonate. And a preferred reaction temperature is 200° C. But the choice of conditions and catalyst concentration can be adjusted depending on the reactivity of the reactants and melting points of the reactants to provide a convenient reaction rate. The only limitation to reaction temperature is that the temperature must be below the degradation temperature of the reactants. Sealed tubes can be used if the reaction temperatures cause the reactants to volatilize and affect the reactant molar balance. The determination of the equilibrium concentration of reactants is accomplished through reaction sampling during the course of the reaction and then analysis of the reaction mixture using a well-known detection method to those skilled in the art such as HPLC (high pressure liquid chromatography). In order to avoid oxidation of the components, the reaction is appropriately conducted under an inert atmosphere, for example nitrogen. Care is appropriately taken so that reaction does not continue after the sample has been removed from the reaction vessel, as this may shift the equilibrium and the reaction mixture composition due to removal of volatile components. This is accomplished by quickly cooling down the sample, for example by immersion in an ice bath, and by employing a reaction quenching acid such as acetic acid in the water phase of the HPLC solvent system. It may also be desirable to introduce a reaction quenching acid directly into the reaction sample in addition to cooling the reaction mixture. A preferred concentration for the acetic acid in the water phase of the HPLC solvent system is 0.05 mole %. The equilibrium constant is determined from the concentration of the reactants and product when equilibrium is reached. Equilibrium is assumed to have been reached when the concentration of components in the reaction mixture reach a point of little or no change on sampling of the reaction mixture. The equilibrium constant can be determined as a ratio of the concentration of products to concentration at equilibrium by methods well known to those skilled in the art. A diaryl carbonate which possesses a relative equilibrium constant (K diarylcarbonate/K diphenylcarbonate) of greater than 1 is considered to possess a greater reactivity than diphenyl carbonate and is an activated carbonate, whereas a diaryl carbonate which possesses an equilibrium constant of 1 or less is considered to possess the same or lesser reactivity than diphenyl carbonate and is considered not to be activated. It is generally preferred to employ an activated carbonate with high or very high reactivity compared to diphenyl carbonate when conducting transesterification reactions. Preferred are activated carbonates with an equilibrium constant greater than at least 100, more preferably at least 1000 times that of diphenyl carbonate.

In addition to the activated diarylcarbonate, the reaction mixture formed in the method of the invention also comprises at least two species of aromatic diols. Suitable aromatic diols are generally flat molecules, such as resorcinol, 4,4'-biphenol, hydroquinone, methylhydroquinone, 4,4'-dihydroxyphenylether, dihydroxynaphthalene, including in particular the 2,6,1,5, and 2,7 isomers, 4,4'-dihydroxybenzophenone and 2,6-dihydroxyanthraquinone (anthraflavic acid). The presence of at least two species of aromatic diol is required because homopolycarbonates of individual diols of this type produce polymers with melting points that are too high to be practically workable. To avoid this high melting point (for example in excess of 370° C.), it is desirable that no single monomer type make up more than 80 mole % of the monomers, for preferably no more than 70 mole %. Specific combinations of aromatic diols include, without limitation:

resorcinol and 4,4'-biphenol
resorcinol and hydroquinone
resorcinol and methylhydroquinone
4,4'-biphenol and hydroquinone
4,4'-biphenol and methylhydroquinone
4,4'-biphenol and 4,4'-dihydroxyphenylether
hydroquinone and 4,4'-dihydroxyphenylether
methylhydroquinone and hydroquinone.
4,4'-biphenol, hydroquinone and methylhydroquinone
4,4'-biphenol, hydroquinone and 4,4'-dihydroxyphenylether
4,4'-biphenol, hydroquinone and resorcinol The composition of the reaction mixture may incorporate other aromatic diols such as bisphenol A (BPA). Such molecules are desirable to lower the manufacturing cost and to maintain a lower melting point. In adding such species that are not flat, however, care should be taken to keep the amount of the additional aromatic levels at a level that does not disrupt the liquid crystalline properties of the resulting polycarbonates. In the case of BPA, amounts of 5 mole % may be successfully included, but amounts greater than 10 mole % are likely to disrupt the liquid crystalline properties. In addition, in selecting the overall compositions of the monomers in the polycarbonate, care should be taken to avoid overly large amounts of monomers such as resorcinol that may give rise to kinks in the backbone. In this regard, it is noted that in the examples below, the polymers made with higher resorcinol levels (for example 15%) are made with flat undisturbed molecules such as hydroquinone and 4,4'-biphenyl. This can be compared with the copolymers described in Examples 19 and 20 of commonly assigned U.S. Patent Publication No. 2003-0149223 containing resorcinol, hydroquinone and methylhydroquinone in a 20/20/60 or 20/40/40 ratio. These compositions are not liquid crystalline in nature. Without intending to be bound to any specific mechanism it is believed that this is because the methyl group of the methylhydroquinone forces the ring to rotate slightly out of the carbonate plane, thereby limiting the LCP nature when combined with kinked molecules such as resorcinol.

The activated diarylcarbonate is included in the reaction mixture in an approximately stoichiometric amount with respect to the amount of aromatic diols. This means that for every one mole of aromatic diol, there is approximately one mole of activated diaryl carbonate, for example from 0.9 to 1.1, more preferably 0.95 to 1.05 and most preferably the diaryl carbonate is present in a slight molar excess, such that the ratio of diol to diaryl carbonate is 0.96 to 0.99.

The reaction mixture is processed in a melt transesterification reaction. As is known in the art, melt transesterification reactions are performed in heated reactors, for example extruders or other vessels such as without limitation wiped film evaporators, horizontal agitated evaporators and disc ring polymerizers in the presence of a transesterifcation catalysts. The reaction mixtures of the present invention are suitably heated to a temperature of 100 to 400° C., more preferably 150 to 370° C. In preparing the liquid crystal polycarbonates of the invention, it may be desrible to use a two-pass extrusion procedure. In addition, it may be desirable to use extruders with limiting amount of venting such that the amount of methyl salicylate retained to act as a solvent through the molecular weight building phases is controllable.

The specific catalyst employed in the method of the invention is not critical. Examples of suitable catalysts comprise at least one source of alkaline earth ions or alkali metal ions, and/or at least one quaternary ammonium compound, quaternary phosphonium compound or a mixture thereof, said source of alkaline earth ions or alkali metal ions being used in an amount such that the amount of alkaline earth or alkali metal ions present in the reaction mixture is in a range between about $10^{-5}$ and about $10^{-8}$ moles alkaline earth or alkali metal ion per mole of aromatic diol compound employed.

The quaternary ammonium compound is selected from the group of organic ammonium compounds having structure VI,

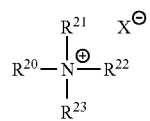

VI wherein $R^{20}$–$R^{23}$ are independently a $C_1$–$C_{20}$ alkyl radical, $C_4$–$C_{20}$ cycloalkyl radical, or a $C_4$–$C_{20}$ aryl radical; and $X^-$ is an organic or inorganic anion. In one embodiment of the present invention anion $X^-$ is selected from the group consisting of hydroxide, halide, carboxylate, sulfonate, sulfate, formate, carbonate, and bicarbonate.

Suitable organic ammonium compounds comprising structure VI are illustrated by tetramethyl ammonium hydroxide, tetrabutyl ammonium hydroxide, tetramethyl ammonium acetate, tetramethyl ammonium formate and tetrabutyl ammonium acetate.

The quaternary phosphonium compound is selected from the group of organic phosphonium compounds having structure VII,

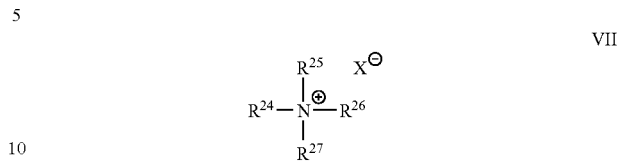

VII wherein $R^{24}$–$R^{27}$ are independently a $C_1$–$C_{20}$ alkyl radical, $C_4$–$C_{20}$ cycloalkyl radical, or a $C_4$–$C_{20}$ aryl radical; and $X^-$ is an organic or inorganic anion. In one embodiment of the present invention anion $X^-$ is an anion selected from the group consisting of hydroxide, halide, carboxylate, sulfonate, sulfate, formate, carbonate, and bicarbonate. Suitable organic phosphonium compounds comprising structure VII are illustrated by tetramethyl phosphonium hydroxide, tetramethyl phosphonium acetate, tetramethyl phosphonium formate, tetrabutyl phosphonium hydroxide, and tetrabutyl phosphonium acetate.

Where $X^-$ is a polyvalent anion such as carbonate or sulfate it is understood that the positive and negative charges in structures VI and VII are properly balanced. For example, where $R^{20}$–$R^{23}$ in structure VI are each methyl groups and $X^-$ is carbonate, it is understood that $X^-$ represents ½ ($CO_3^{-2}$).

Suitable sources of alkaline earth ions include alkaline earth hydroxides such as magnesium hydroxide and calcium hydroxide. Suitable sources of alkali metal ions include the alkali metal hydroxides illustrated by lithium hydroxide, sodium hydroxide and potassium hydroxide. Other sources of alkaline earth and alkali metal ions include salts of carboxylic acids, such as sodium acetate and derivatives of ethylene diamine tetraacetic acid (EDTA) such as EDTA tetrasodium salt, and EDTA magnesium disodium salt.

Use of activated carbonates such as bismethylsalicyl carbonates results in polymer formation in which the vast majority of the linkages between the aromatic diol residues are carbonate linkages. To a minor extent structural units indicative of the activated carbonate are also formed. For example 0.2 to 1 mole % of internal carbonate ester linkages may be formed. FIG. 1 illustrates the process by which this can occur. As shown, methyl salicylate, formed as a by-product of the main reaction, reacts with the end of a growing polymer. The free hydroxyl group of the salicylate group then serves as a hydroxyl end-group in the formation of a carbonate linkage with the next aromatic diol. This results in a kink in the chain which is characteristic of the use of BMSC or a similar diarylcarbonate diester as the activated carbonate. Endcaps derived from the activated diarylcarbonate, for example methylsalicyl endcaps in the case of BMSC, can also be incorporated in the polymer to a small extent.

Figure 2:
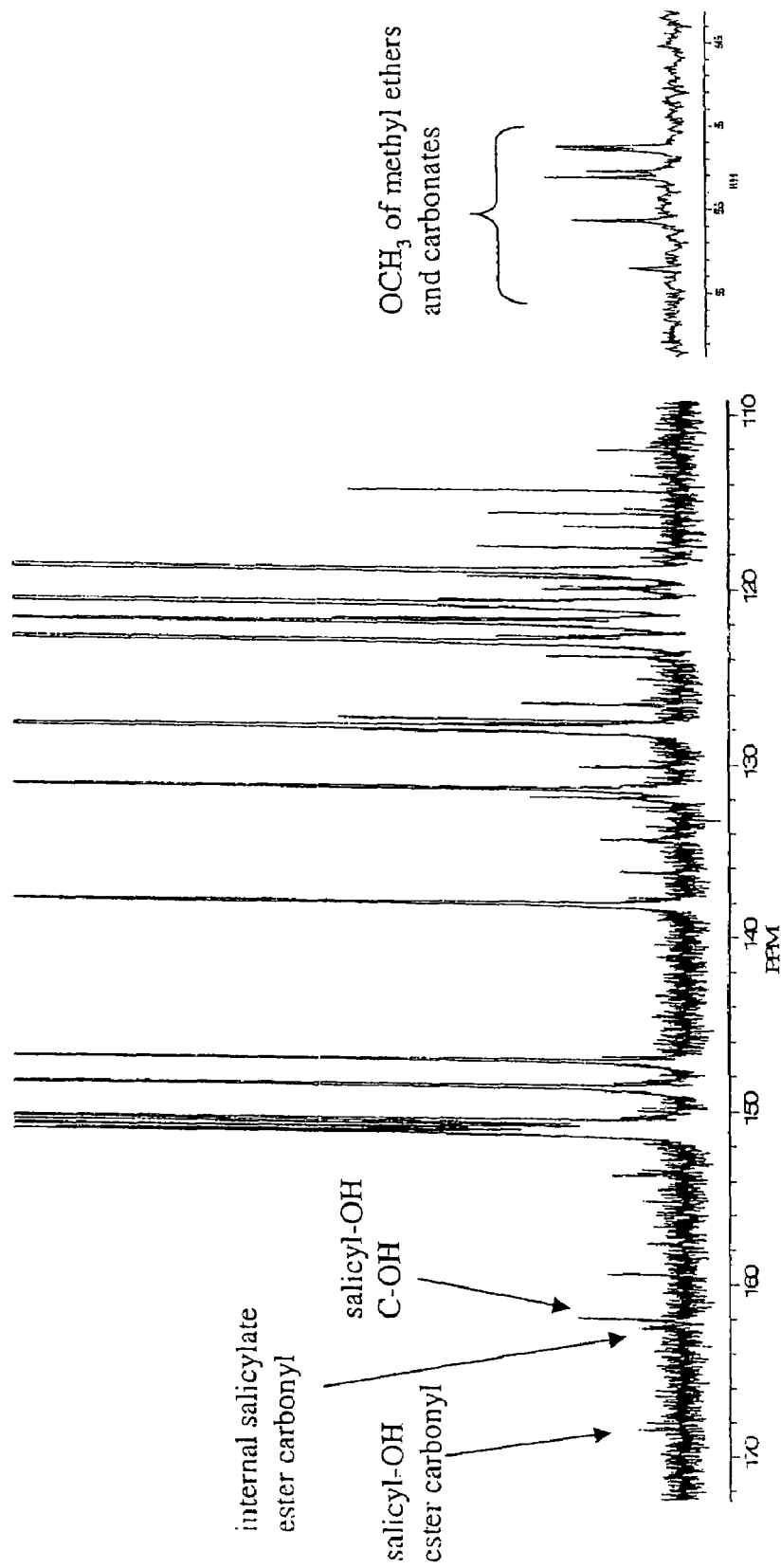
FIG. 2 shows a $^{13}$C NMR spectrum in the 110–170 ppm range of a 65/35 MeHQ/BP copolymer in tetrachloroethane-$d_2$ at 80° C.
Figure 3:
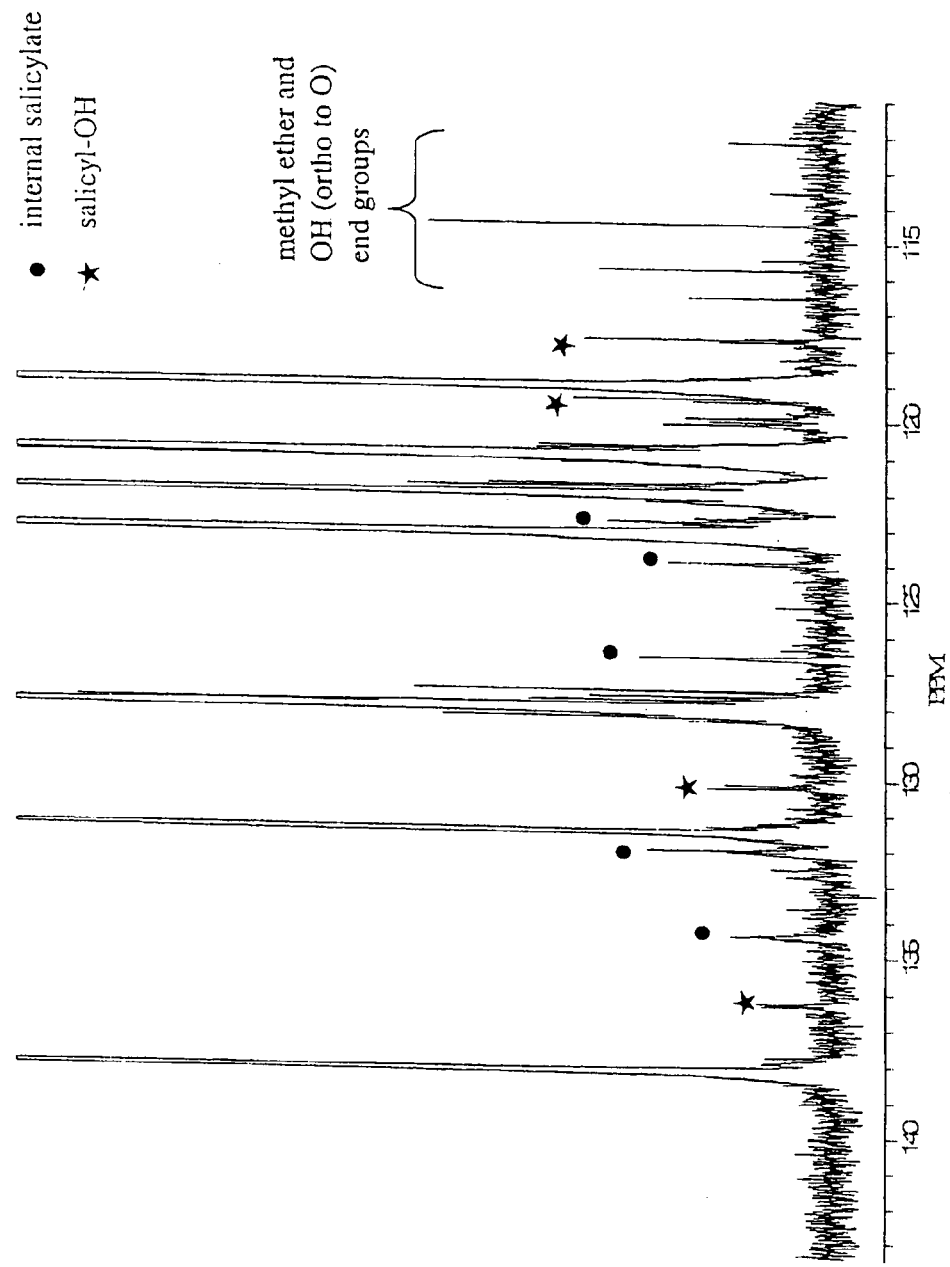
FIG. 3 shows $^{13}$C NMR spectrum in the 140–115 ppm range of a 65/35 MeHQ/BP copolymer in tetrachloroethane-$d_2$ at 80° C.

The presence of the kink and of activated-carbonate derived endcaps, can be detected by $^{13}$C NMR. FIG. 2 shows a $^{13}$C NMR spectrum in the 110–170 ppm range of a 65/35 MeHQ/BP copolymer in tetrachloroethane-$d_2$ at 80° C., prepared using BMSC as the carbonate source. FIG. 3 shows $^{13}$C NMR spectrum in the 140–115 ppm range of the same 65/35 MeHQ/BP copolymer in tetrachloroethane-$d_2$ at 80° C. Comparable extra peaks will appear when species other than BMSC are used as the activated carbonate, and species other than MeHQ and BP are used as the dihydroxy aromatic compounds. Presence of these peaks is indicative of the presence of a residue of an activated diarylcarbonate. A further aspect of the invention is a liquid crystal polycarbonate composition that comprises structural units indicative of the activated carbonate. In preferred embodiments, these structural units are residues of BMSC. The liquid crystal compositions of the invention are useful in making molded products, particularly for applications where heat resistance, dimensional stability and solvent resistance are of importance. The compositions have high heat capabilities and chemical and dimensional stability; and a high flow rate that allows them to fill thin, complicated parts easily. The compositions of the invention can be as connectors on devices where lead-free solder is used to join the metal conductors. For some applications, the liquid crystal polycarbonate is filled, for example with up to 50% by weight fillers. In certain embodiments, the amount of filler is up to 30% by weight. Suitable filler include without limitation fillers such as glass, mineral or carbon fiber fillers. The filler enhances the properties of the liquid crystal by mitigating the reduced properties in the cross flow direction, due to the anisotropy of the resin. In addition, the filler reduces manufacturing cost.

In accordance with a further embodiment of the invention there is provided a method for making a molded article comprising the steps of:

(a) melting a liquid crystal polycarbonate as described herein;

(b) introducing the melted liquid crystal polycarbonate into a mold defining the shape of the article; and (c) allowing the melted liquid crystal polycarbonate to solidify in the mold to form the molded article. Optionally, the melted liquid crystal polycarbonate composition can include a filler. The molded article thus produced, which is itself an aspect of the present invention, may be subsequently removed from the mold. Introduction of the melted liquid crystal polycarbonate into the mold may be by injection molding techniques. Specific molded articles that may be made in accordance with the invention include, without limitation electrical connectors for wire or circuit boards. Liquid crystal compositions of the invention may also be spun into high strength fibers.

The invention will now be further described with reference to the following non-limiting examples.

EXAMPLE 1

Preparation of LCP with 45% HQ-45% BP-10% DHPE (Small Scale)

Step 1: Preparation of the Oligomer

A mixture of 15.408 g (0.14 mole) of hydroquinone, 6.289 g (0.031 mole) of 4,4'-dihydroxyphenylether, 26.060 g (0.140 mole) of biphenol and 104.705 g (0.317 mole) BMSC was placed in a 3-necked round bottom flask equipped with a mechanical stirrer, a temperature control probe and an adapter connected to a condenser/receiver for the vacuum distillation. To the mixture was added 620 ul of 1×10–3M aqueous solution of NaOH and 78 ul of 1.0M aqueous solution of tetramethylammonium hydroxide. The mixture was then immersed into an oil bath at 200° C. and the stirring started after about 15 min, when some of the solids had melted. After stirring for about 10–15 minutes, the reaction mixture became a clear solution. The internal temperature was 193° C. at this point. The reaction mixture started to turn cloudy after another 5 min and slowly turned milky and become viscous. Gradually the viscous milky mixture solidified and the stirring occurred only at the center of the mixture. The speed of the agitator was reduced. The mixture was kept at this temperature (~190° C.) and allowed it to equilibrate for a total of 1.5 hours, than vacuum was initiated to distill out the methyl salicylate formed during the reaction. The distillation was terminated when a total of 63.86 g of methyl salicylate (~70%) were collected in the receiver. The oligomer was cooled and then removed from flask as an off white solid. Wt: 84.38 g Step 2: MW Build of the LCP Oligomer 40.2 g of the above oligomer was placed in a cylindrical reaction tube. The tube was connected to a reaction system equipped with a condensing system, vacuum source and a stainless steel agitator and constant speed drive motor. The reaction system was blanketed with nitrogen. The solid was heated with an electrically heated aluminum block and the temperature set to 310° C. When the heating system reached 310° C. the set point was raised to 340° C. After the oligomer began to melt, the stirrer was started at a lower speed and the vacuum started, slowly lowering the pressure to less than 1 millibar. Gradually the stirrer speed was increased to 180 RPM. The reaction system was then kept at high vacuum for about 40–45 minutes. During this process, residual methyl salicylate was distilled out and collected in a receiving tube (12.2 g). At the end of the reaction, the vacuum was terminated and the system was flushed with nitrogen. The reaction tube was removed from the system The light tan LCP was scraped off from the blade and the rest was removed from the reaction tube after it was cooled. Thermal properties of the LCP was obtained by DSC: Tm=289° C. and Tc=247° C. with no Tg observed.

EXAMPLE 2

Preparation of a 50/50 Mole % Biphenol/Hydroquinone Liquid Crystalline Co-polycarbonate (Large Scale)

Equipment: 12 liter Reaction flask equipped with a 6 inch flanged head assembly, a stainless steel agitator shaft and anchor stirrer, a high torque constant speed agitator motor. The head was equipped with a condenser assembly with receiving flask, a nitrogen inlet and a thermocouple probe for measuring melt temperature. The flask was heated with a dual zone heating mantle with two variable voltage controllers used for adjusting temperature.

Reaction Charge: Hydroquinone—660.8 grams (6.000 moles), Biphenol—1117.3 grams (6.000 moles) and Bis-(methylsalicyl)carbonate—4042.9 grams (12.240 moles).

Catalyst Charge: 3.0 ml of a 1.0 molar aqueous Tetramethyl ammonium Hydroxide solution and 1.2 ml of a 0.02 molar aqueous Sodium Hydroxide solution.

Start: Charge Hydroquinone, Biphenol and Bis-(methylsalicyl)carbonate to vessel blanketed with nitrogen. The reaction profile and comments are as follows:

| Time(Hours) | Melt Temperature | Comments |
|---|---|---|
| 0 | 21.7 | Turn on heaters 42 volts each variac |
| 2 | 112.7 | Liquid pool in reactor, large amount of solid |
| 3:15 | 117.1 | Hand turn agitator |
| 3:30 | 119.2 | Agitator on at 5 RPM Add both catalysts, raise voltage to 45 each variac |
| 3:35 | 116.2 | Raise agitator speed to 15 RPM |
| 3:50 | 125.2 | agitator 15 to 20 RPM liquid pool with some undissolved solid |
| 4:00 | 131.9 | agitator 20 to 25 RPM liquid pool with some undissolved solid |
| 4:05 | 134.5 | agitator 25 to 30 RPM liquid pool with some undissolved solid |
| 4:10 | 135.8 | agitator 30 to 35 RPM liquid pool with some undissolved solid |
| 4:15 | 138.8 | agitator 35 to 40 RPM liquid pool with some undissolved solid |
| 4:20 | 140 | agitator 40 to 45 RPM liquid pool with some undissolved solid |
| 4:27 | 142 | agitator 45 to 50 RPM liquid pool with some undissolved solid |
| 4:30 | 143.3 | 50 RPM no undissolved solid |
| 4:35 | 144.9 | 50 RPM no undissolved solid solution almost clear |
| 4:40 | 146.9 | 50 RPM no undissolved solid solution almost clear |
| 4:45 | 148.6 | 50 RPM no undissolved solid solution almost clear |
| 4:50 | 150.4 | 50 RPM no undissolved solid solution almost clear |
| 4:55 | 152.7 | 50 RPM solution clear |
| 5:00 | 155.4 | 50 RPM solution clear |
| 5:05 | 158.5 | 50 RPM solution becoming cloudy |
| 5:10 | 162.4 | 50 RPM solution becoming milky Torque = 1 |
| 5:15 | 168 | 50 RPM solution milky some apparent viscosity Torque = 2 |
| 5:20 | 172.4 | 50 RPM temperature bouncing, viscosity building Torque = 8 |
| 5:23 | 177.7 | 50 RPM very viscous Torque = 47 |
| 5:25 | 181.6 | 50 RPM difficult to stir Torque = 125 |
| 05:25.5 | 182.4 | Stop agitator start vacuum |
| 5:31 | | Stop vacuum a total of 285 grams methyl salicylate collected |

The resulting "wet solid" was allowed to cool overnight, the next morning the solid was removed by inverting the vessel after removal of the flanged top. Yield ~5500 grams of powder. The powder was placed in a vacuum drying oven at 160° C. and a vacuum of 100 mm of mercury for 20 hours. The "dried" powder weighed 2568 grams. The resulting dry powder was fed into a vacuum vented twin screw extruder with the barrel sections heated to ~340–345° C. The polymer strands exiting the extruder were chopped. The polymer was insoluble in all common solvents. A DSC scan of the polymer indicated a melting transition at 331° C., no apparent Tg, and a Tc scanning down at 20° C./min of 294° C. The polymer melt was opaque indicating the liquid crystalline nature of the product.

EXAMPLE 3

Samples were made with varying compositions as outlined in the table below using one of the method of example 1, 2 or 4 as set forth herein as indicated in the last column of the table. All of the compositions were determined to be liquid crystal materials by viewing microscopically between cross polarizers in the melt and observing birefringence. The Tm in the table was determined by differential scanning calorimetry and the temperature of the transition from solid to a fluid liquid crystal was determined using a hot stage microscope.

| Composition | | | | | | | | | |
|---|---|---|---|---|---|---|---|---|---|
| HQ | 4,4'BP | RS | MeHQ | DHPE | BPA | 2,6ND | 1,5ND | Tm | Ex |
| 60 | 40 | | | | | | | 356 | 1 |
| 55 | 45 | | | | | | | 341 | 1 |
| 50 | 50 | | | | | | | 330 | 2 |
| 45 | 55 | | | | | | | 335 | 1 |

-continued

| Composition | | | | | | | | | |
|---|---|---|---|---|---|---|---|---|---|
| HQ | 4,4'BP | RS | MeHQ | DHPE | BPA | 2,6ND | 1,5ND | Tm | Ex |
| 40 | 60 | | | | | | | 343 | 1 |
| 51 | 34 | 15 | | | | | | 317 | 2 |
| 54 | 36 | 10 | | | | | | 323 | 1 |
| 45 | 45 | 10 | | | | | | 297 | 2 |
| 47.5 | 47.5 | 5 | | | | | | 318 | 2 |
| 42.5 | 42.5 | 15 | | | | | | 302 | 1 |
| 47.5 | 47.5 | | | 5 | | | | 302 | 1 |
| 45 | 45 | | | 10 | | | | 289 | 2 |
| 47.5 | 47.5 | | 5 | | | | | 312 | 2 |
| 45 | 45 | | 10 | | | | | 296 | 1 |
| 47.5 | 47.5 | | | | 5 | | | 325 | 1 |
| 47.5 | 47.5 | | | | | | 5 | 315 | 1 |
| 45 | 45 | | | | | 10 | | 286 | 1 |
| 50 | | | 50 | | | | | 309 | 1 |
| 55 | | | 45 | | | | | 325 | 1 |
| | 40 | | 60 | | | | | 221 | 4 |
| | 35 | | 65 | | | | | 242 | 4 |

EXAMPLE 4

To a 30 gallon titanium-lined, jacketed vessel were added the following components BMSC—16,965 grams (51.41 moles); Hydroquinone—3,000 grams (27.27 moles), (54 mole %), 4,4' Biphenol—3,381 grams (18.18 moles) (36 mole %) and Resorcinol—556 grams (5.05 Moles) (10 mole %). The catalyst added was $2.0 \times 10^{-4}$ moles of Sodium Hydroxide and $1.26 \times 10^{-3}$ moles of tetramethylammonium hydroxide.

The mixture was heated with stirring to 205° C., than held at that temperature for 2.5 hours. The opaque solution was then feed directly to a twin screw vacuum vented extruder, where the methyl salicylate was removed under vacuum. The polymer exited the extruder as an opaque fluid and was stranded and chopped. The product exhibited a melting point of 346° C. and a Tc scanning down at 20 degrees C./min of 270° C.

This example exhibits the higher Tm values accessible using larger process equipment and hence greater MW build, since the same composition run on the small scale of Example 1 had an observed Tm of 323° C.

What is claimed is:

1. A method for forming a liquid crystal polycarbonate comprising the steps of:
   forming a reaction mixture comprising
   (a) an activated diaryl carbonate; and
   (b) at least two species of aromatic diol monomers selected from the group consisting of resorcinol, 4,4'-biphenol, hydroquinone, methylhydroquinone, 4,4'-dihydroxyphenylether, dihydroxynaphthalene, 4,4'-dihydroxybenzophenone and 2,6-dihydroxyanthraquinone; and
   processing the reaction mixture in a melt transesterification reaction to form a liquid crystal polycarbonate.

2. The method of claim 1, wherein the activated diaryl carbonate is a diester carbonate.

3. The method of claim 2, wherein the activated diaryl carbonate is selected from the group consisting of bis(methylsalicyl)carbonate, bis(ethyl salicyl)carbonate, bis(propyl salicyl) carbonate, bis(butylsalicyl)carbonate, bis(benzyl salicyl)carbonate, and bis(methyl 4-chlorosalicyl)carbonate.

4. The method of claim 2, wherein the activated diaryl carbonate is bis(methylsalicyl)carbonate.

5. The method of claim 4, wherein the catalyst comprises (a) at least one source of alkaline earth ions or alkali metal ions, (b) at least one quaternary ammonium compound or quaternary phosphonium compound or a mixture thereof; or (c) a mixture of (a) and (b).

6. The method of claim 2, wherein the catalyst comprises (a) at least one source of alkaline earth ions or alkali metal ions, (b) at least one quaternary ammonium compound or quaternary phosphonium compound or a mixture thereof; or (c) a mixture of (a) and (b).

7. The method of claim 1, wherein the reaction mixture contains only two species of aromatic diol.

8. The method of claim 7, wherein neither species of aromatic diol makes up more than 80 mole % of the monomers in the reaction mixture.

9. The method of claim 8, wherein the activated diaryl carbonate is a diester carbonate.

10. The method of claim 9, wherein the activated diaryl carbonate is selected from the group consisting of bis(methylsalicyl)carbonate, bis(ethyl salicyl)carbonate, bis(propyl salicyl)carbonate, bis(butylsalicyl)carbonate, bis(benzyl salicyl)carbonate, and bis(methyl 4-chlorosalicyl)carbonate.

11. The method of claim 9, wherein the activated diaryl carbonate is bis(methylsalicyl)carbonate.

12. The method of claim 11, wherein the catalyst comprises (a) at least one source of alkaline earth ions or alkali metal ions, (b) at least one quaternary ammonium compound or quaternary phosphonium compound or a mixture thereof; or (c) a mixture of (a) and (b).

13. The method of claim 9, wherein the catalyst comprises (a) at least one source of alkaline earth ions or alkali metal ions, (b) at least one quaternary ammonium compound or quaternary phosphonium compound or a mixture thereof; or (c) a mixture of (a) and (b).

14. The method of claim 1, wherein no species of aromatic diol makes up more than 80 mole % of the monomers in the reaction mixture.

15. A liquid crystal polycarbonate composition comprising:
   residues of at least two species of aromatic diols selected from the group consisting of resorcinol, 4,4'-biphenol, hydroquinone, methylhydroquinone, 4,4'-dihydroxyphenylether, dihydroxynaphthalene, 4,4'-dihydroxybenzophenone and 2,6-dihydroxyanthraquinone; and
   structural units indicative of an activated diaryl carbonate.

16. The composition of claim 15, wherein the activated diaryl carbonate is a diester carbonate.

17. The composition of claim 16, wherein the activated diaryl carbonate is selected from the group consisting of bis(methylsalicyl)carbonate, bis(ethyl salicyl)carbonate, bis(propyl salicyl)carbonate, bis(butylsalicyl)carbonate, bis(benzyl salicyl)carbonate, and bis(methyl 4-chlorosalicyl)carbonate.

18. The composition of claim 16, wherein the activated diaryl carbonate is bis(methylsalicyl)carbonate.

19. The composition of claim 18, wherein the residues of the aromatic diols comprise residues of resorcinol and 4,4'-biphenol.

20. The composition of claim 18, wherein the residues of the aromatic diols comprise residues of resorcinol and hydroquinone.

21. The composition of claim 18, wherein the residues of the aromatic diols comprise residues of resorcinol and methylhydroquinone.

22. The composition of claim 18, wherein the residues of the aromatic diols comprise residues of resorcinol and 4,4'-dihydroxyphenylether.

23. The composition of claim 18, wherein the residues of the aromatic diols comprise residues of 4,4'-biphenol and hydroquinone.

24. The composition of claim 18, wherein the residues of the aromatic diols comprise residues of 4,4'-biphenol and methylhydroquinone.

25. The composition of claim 18, wherein the residues of the aromatic diols comprise residues of 4,4'-biphenol and 4,4'-dihydroxyphenylether.

26. The composition of claim 18, wherein the residues of the aromatic diols comprise residues of hydroquinone and 4,4'-dihydroxyphenylether.

27. The composition of claim 18, wherein the residues of the aromatic diols comprise residues of 4,4'-biphenol, hydroquinone and 4,4'-dihydroxyphenylether.

28. The composition of claim 18, wherein the residues of the aromatic diols comprise residues of 4,4'-biphenol, hydroquinone and methylhydroquinone.

29. The composition of claim 18, wherein the residues of the aromatic diols comprise 4,4'-biphenol, hydroquinone and resorcinol.

30. The composition of claim 18, wherein the residues of the aromatic diols comprise 4,4'-biphenol, hydroquinone and bisphenol A.

31. A method for making a molded article comprising the steps of:
   (a) melting a liquid crystal polycarbonate comprising:
      residues of at least two species of aromatic diols selected from the group consisting of resorcinol, 4,4'-biphenol, hydroquinone, methylhydroquinone, 4,4'-dihydroxyphenylether, dihydroxynaphthalene, 4,4'-dihydroxybenzophenone and 2,6-dihydroxyanthraquinone; and
      residues derived from an activated diaryl carbonate, (b) introducing the melted liquid crystal polycarbonate into a mold defining the shape of the article; and (c) allowing the melted liquid crystal polycarbonate to solidify in the mold to form the molded article.

32. The method of claim 31, wherein the activated diaryl carbonate is a diester carbonate.

33. The method of claim 32, wherein the activated diaryl carbonate is selected from the group consisting of bis (methylsalicyl)carbonate, bis(ethyl salicyl)carbonate, bis (propyl salicyl)carbonate, bis(butylsalicyl)carbonate, bis (benzyl salicyl)carbonate, and bis(methyl 4-chlorosalicyl) carbonate.

34. The method of claim 32, wherein the activated diaryl carbonate is bis(methylsalicyl)carbonate.

35. The method of claim 34, wherein the residues of the aromatic diols comprise residues of resorcinol and 4,4'-biphenol.

36. The method of claim 34, wherein the residues of the aromatic diols comprise residues of resorcinol and hydroquinone.

37. The method of claim 34, wherein the residues of the aromatic diols comprise residues of resorcinol and methylhydroquinone.

38. The method of claim 34, wherein the residues of the aromatic diols comprise residues of resorcinol and 4,4'-dihydroxyphenylether.

39. The method of claim 34, wherein the residues of the aromatic diols comprise residues of 4,4'-biphenol and hydroquinone.

40. The method of claim 34, wherein the residues of the aromatic diols comprise residues of 4,4'-biphenol and methylhydroquinone.

41. The method of claim 34, wherein the residues of the aromatic diols comprise residues of 4,4'-biphenol and 4,4'-dihydroxyphenylether.

42. The method of claim 34, wherein the residues of the aromatic diols comprise residues of hydroquinone and 4,4'-dihydroxyphenylether.

43. The method of claim 34, wherein the residues of the aromatic diols comprise residues of 4,4'-biphenol, hydroquinone and 4,4'-dihydroxyphenylether.

44. The method of claim 34, wherein the residues of the aromatic diols comprise residues of 4,4'-biphenol, hydroquinone and methylhydroquinone.

45. The method of claim 34, wherein the residues of the aromatic diols comprise 4,4'-biphenol, hydroquinone and resorcinol.

46. The method of claim 36, wherein the residues of the aromatic diols comprise 4,4'-biphenol, hydroquinone and bisphenol A.

47. The method of claim 31, wherein a filler is introduced into the mold with the melted liquid crystal polycarbonate.

48. A molded article formed by the method of claim 31.

49. A molded article comprising a liquid crystal polycarbonate, said liquid crystal polycarbonate comprising:

residues of at least two species of aromatic diols selected from the group consisting of resorcinol, 4,4'-biphenol, hydroquinone, methylhydroquinone, 4,4'-dihydroxyphenylether, dihydroxynaphthalene, 4,4'-dihydroxybenzophenone and 2,6-dihydroxyanthraquinone; and residues derived from an activated diaryl carbonate.

* * * * *